US012111172B2

(12) United States Patent
Kang et al.

(10) Patent No.: US 12,111,172 B2
(45) Date of Patent: Oct. 8, 2024

(54) APPARATUS AND METHOD OF PROVIDING CONTEXTUAL-INFORMATION-BASED SERVICE

(71) Applicants: HYUNDAI MOTOR COMPANY, Seoul (KR); KIA MOTORS CORPORATION, Seoul (KR)

(72) Inventors: Nam Hyung Kang, Yongin-si (KR); Jeong Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 146 days.

(21) Appl. No.: 17/144,753

(22) Filed: Jan. 8, 2021

(65) Prior Publication Data

US 2021/0270624 A1    Sep. 2, 2021

(30) Foreign Application Priority Data

Feb. 28, 2020  (KR) .................. 10-2020-0024759
Apr. 6, 2020   (KR) .................. 10-2020-0041493

(51) Int. Cl.
*G01C 21/36*     (2006.01)
*G01C 21/34*     (2006.01)
*H04L 51/10*     (2022.01)
*H04L 51/222*    (2022.01)

(52) U.S. Cl.
CPC ....... *G01C 21/362* (2013.01); *G01C 21/3476* (2013.01); *G01C 21/3617* (2013.01); *G01C 21/3694* (2013.01); *H04L 51/10* (2013.01); *H04L 51/222* (2022.05)

(58) Field of Classification Search
None
See application file for complete search history.

(56) References Cited

U.S. PATENT DOCUMENTS

| | | | | |
|---|---|---|---|---|
| 11,402,223 | B1* | 8/2022 | Grealish-Rust | G01C 21/3614 |
| 2010/0057347 | A1* | 3/2010 | Sugiyama | G01C 21/3611 |
| | | | | 701/465 |

(Continued)

OTHER PUBLICATIONS

"Trip similarity computation for context-aware travel recommendation exploiting geotagged photos," 2014 IEEE 30th International Conference on Data Engineering Workshops, 2014, pp. 330-334, doi:10.1109/ICDEW.2014.6818350. (Year: 2014).*

*Primary Examiner* — Tuan C To
*Assistant Examiner* — David Ruben Pedersen
(74) *Attorney, Agent, or Firm* — Slater Matsil, LLP

(57) ABSTRACT

An apparatus and method of providing a contextual-information-based service are provided. The method includes acquiring information of at least one content posted through a first service based on information on activities of the first service of a user, transmitting the acquired information on the at least one content to a terminal, when any one of the information on the at least one content is selected by the terminal, generating at least one route information for arrival at a time of forming a similar environment to an environment when content corresponding to the selected content information is generated, based on contextual information of the content corresponding to the selected content information, and transmitting the generated at least one route information to the terminal.

20 Claims, 7 Drawing Sheets

(56) References Cited

U.S. PATENT DOCUMENTS

2016/0127294 A1* 5/2016 Prakah-Asante ..... H04L 51/222
                                                                709/206
2019/0215659 A1* 7/2019 Kusanagi ................ H04W 4/21
2020/0103244 A1* 4/2020 Cella .................. G06Q 30/0265

* cited by examiner

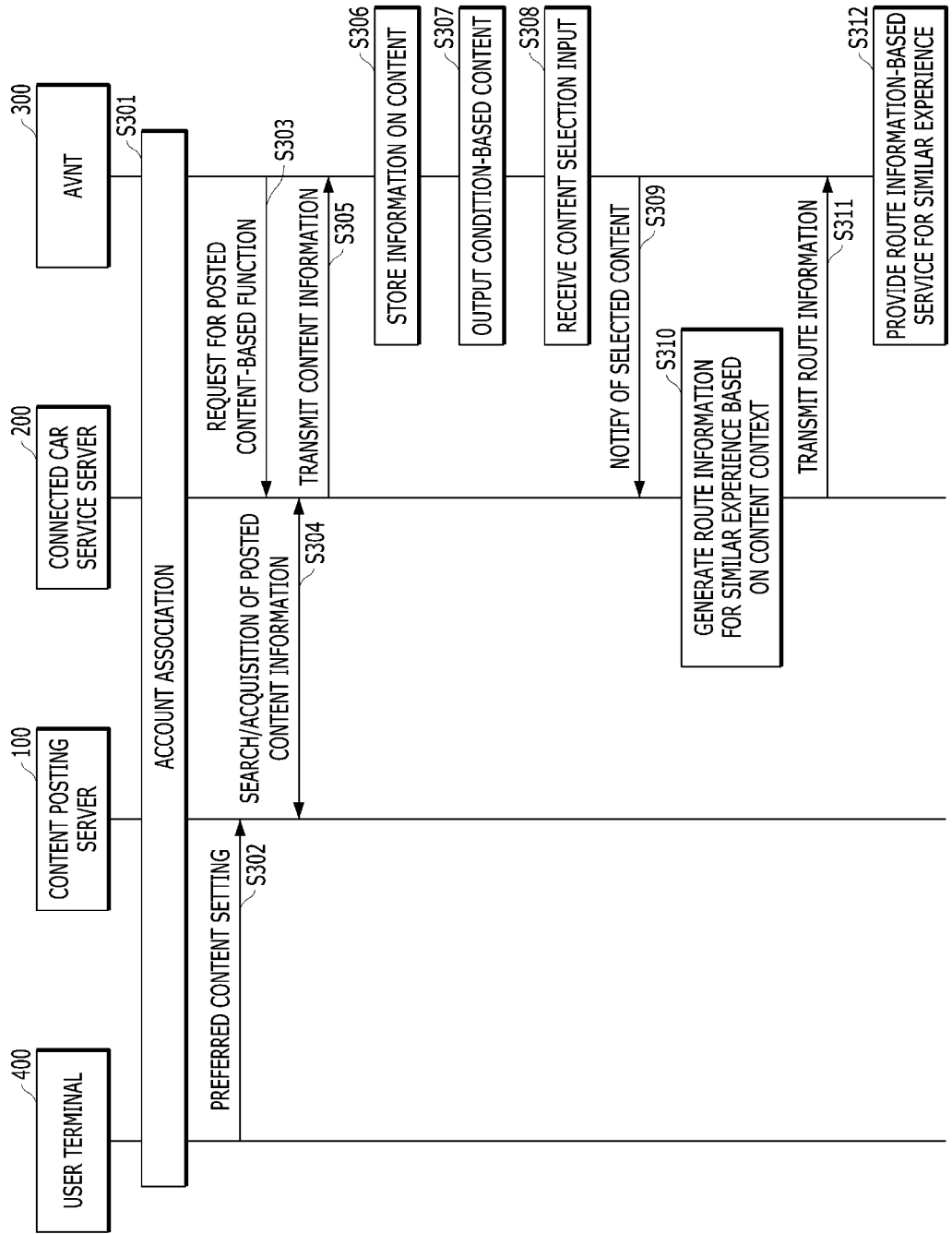

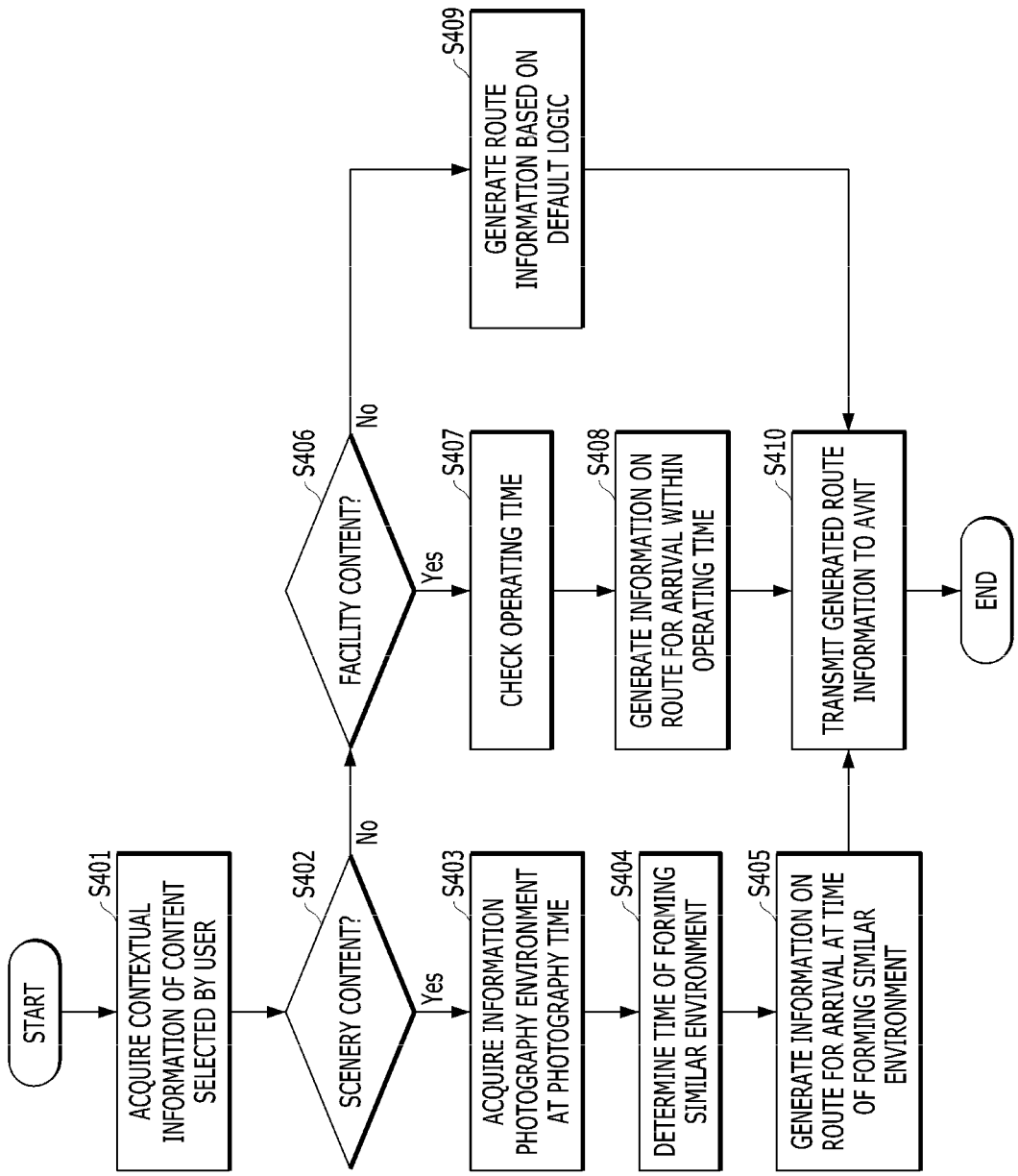

APPARATUS AND METHOD OF PROVIDING CONTEXTUAL-INFORMATION-BASED SERVICE

CROSS-REFERENCE TO RELATED APPLICATION

The present application claims priority to and the benefit of Korean Patent Application No. 10-2020-0024759, filed on Feb. 28, 2020 and Korean Patent Application No. 10-2020-0041493, filed on Apr. 6, 2020, which are hereby incorporated by reference in their entirety.

TECHNICAL FIELD

The present disclosure relates to an apparatus and method of providing a contextual-information-based service for providing an experience similar to that of generating content using contextual information of the content, to a user.

BACKGROUND

When a general navigation system is used, a user needs to know an address or a title for specifying a destination in order to set the destination through text-based search. Thus, the user needs to directly search for positional information in a post or an item and to input the positional information to the navigation system in order to directly have experience related to corresponding content while reading the content such as a post of a social network service (SNS).

This means that the user is disconnected from contextual information of scenery or places that the user likes in a SNS. As a result, when the user wants to directly experience content in which he or she is interested, if the user does not go through the inconvenience of searching for additional information such as a corresponding position or place and inputting the information, digital experience and actual experience are inevitably disconnected from each other.

For example, when the user sees scenery photography to be seen in a specific time range on the SNS and wants to directly experience the same scenery as the scenery photography with the unaided eye at a corresponding place, the user just infers a destination through a title or an additionally input text of a corresponding post. In other word, a spot related to corresponding content may be set to the destination, but the user inevitably experiences the inconvenience of performing search and inputting the destination, and even if the user reaches the destination, it may not be convinced whether similar experience to the corresponding content is possible at the time at which the user reaches the destination.

Accordingly, a method of aiding similar offline experience to content but not a simple guide may be desired when a destination is set based on content.

SUMMARY

The present disclosure provides a method and apparatus for providing a more convenient contextual-information-based service.

In particular, the present disclosure provides a method and apparatus for providing a route guidance service for having similar experience to corresponding content by extracting contextual information from content.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of providing a content contextual-information-based service includes acquiring at least one content information posted through a first service based on information on activities of the first service of a user, transmitting the acquired the at least one content information to a terminal, when any one of the at least one content information is selected by the terminal, generating at least one route information for arrival at a time of forming a similar environment to an environment when content corresponding to the selected content information is generated, based on contextual information of the content corresponding to the selected content information, and transmitting the generated at least one route information to the vehicle terminal.

In another aspect of the present disclosure, a content contextual-information-based service provision system includes a first server configured to acquire at least one content information posted through a first service based on activity information of the first service of a user, from a second server, and a terminal configured to receive the acquired the at least one content information and to, when receiving selection input of any one of the at least one content information, transmit information on the selection input to the first server, wherein the first server generates at least one route information for arrival at a time of forming a similar environment to an environment when content corresponding to the selected content information is generated, based on contextual information of the content corresponding to the selected content information and transmits the at least one of route information to the terminal.

DRAWINGS

The accompanying drawings, which are included to provide a further understanding of the disclosure and are incorporated in and constitute a part of this application, illustrate embodiment (s) of the disclosure and together with the description serve to explain the principle of the disclosure. In the drawings:

FIG. 3 is a flowchart showing an example of a procedure of providing a contextual-information-based service of content in some forms of the present disclosure;

FIG. 4 is a flowchart showing an example of a procedure of generating route information by a service server in some forms of the present disclosure;

Figure 5A:
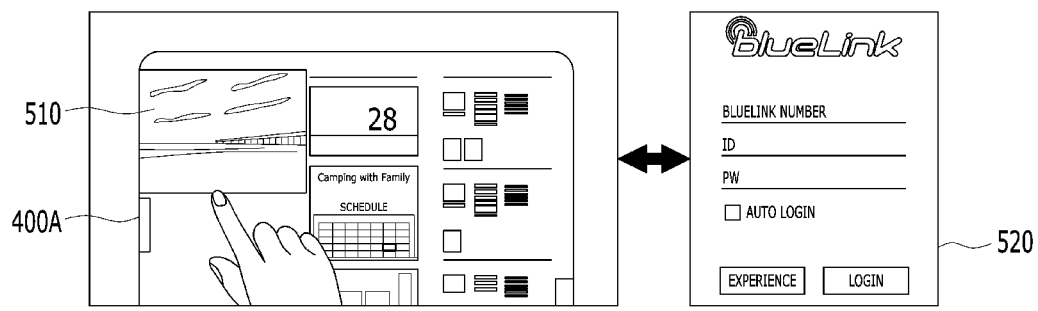
Figure 5B:
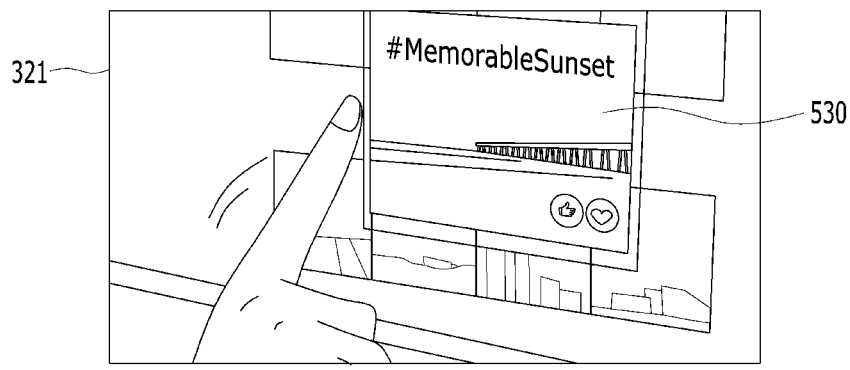
Figure 5C:
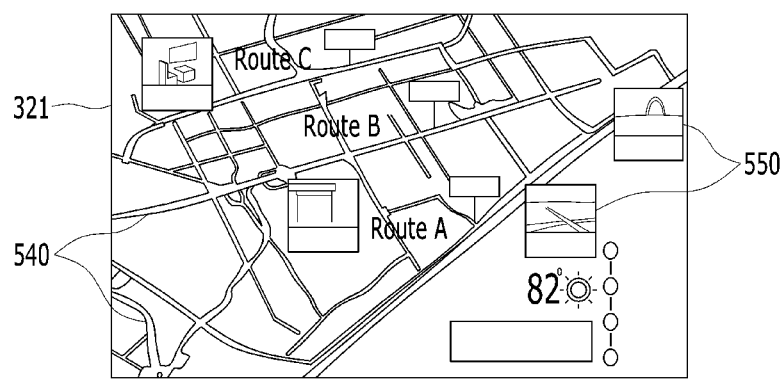
Figure 6A:
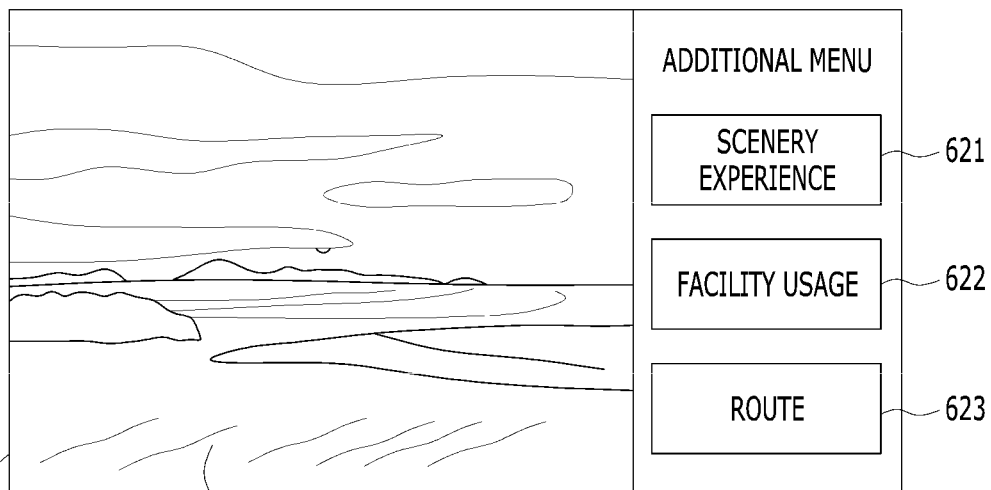
Figure 6B:
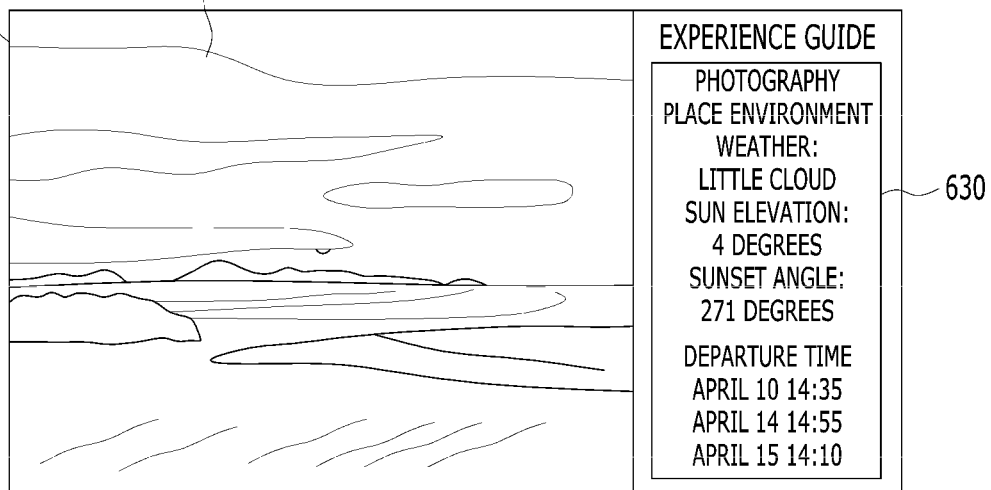
Figure 7A:
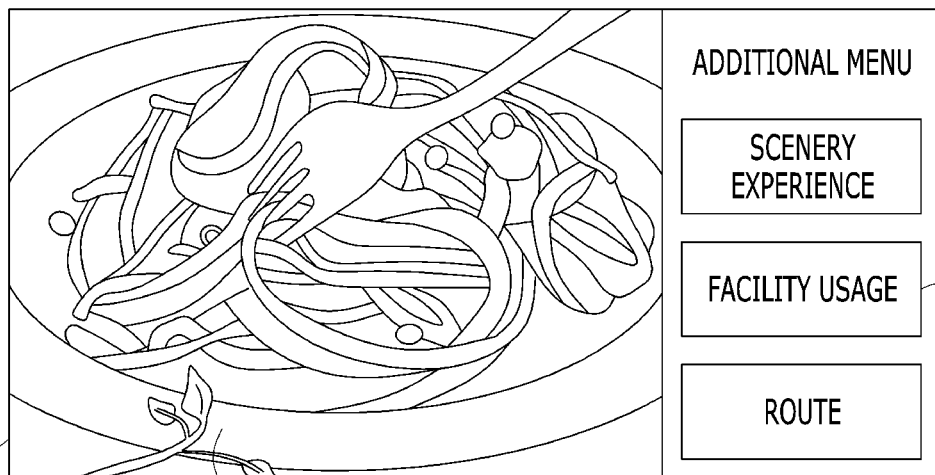
Figure 7B:
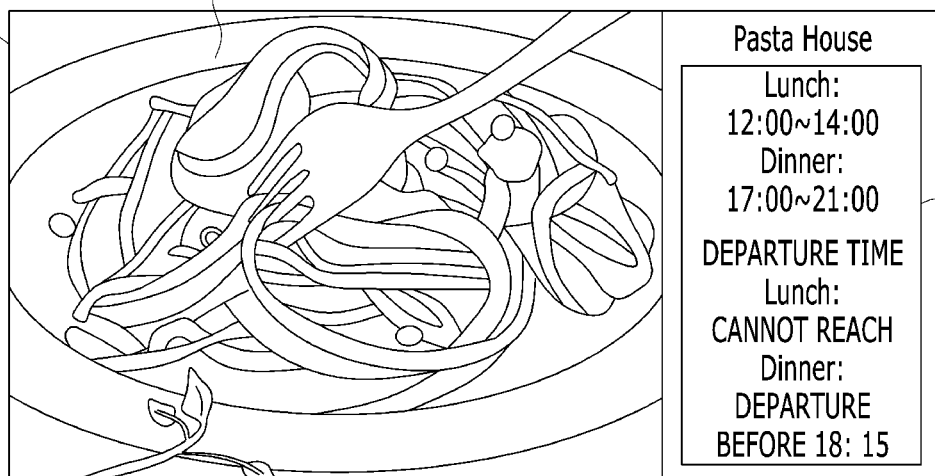
Figure 8A:
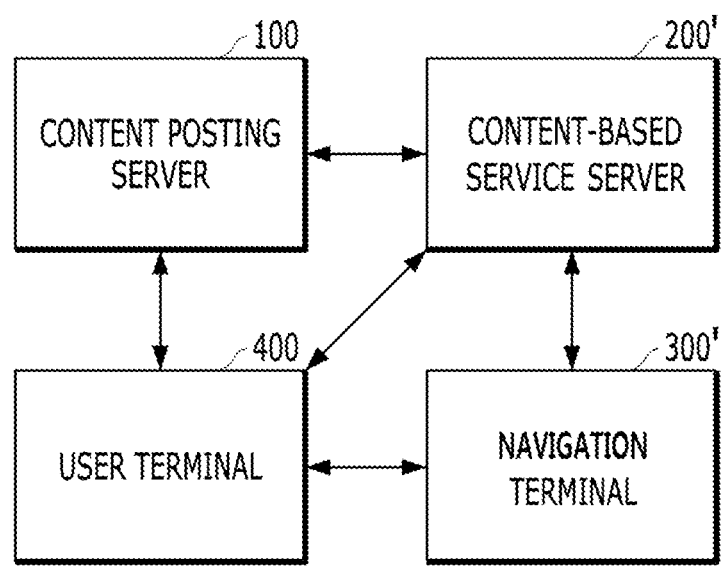
Figure 8B:
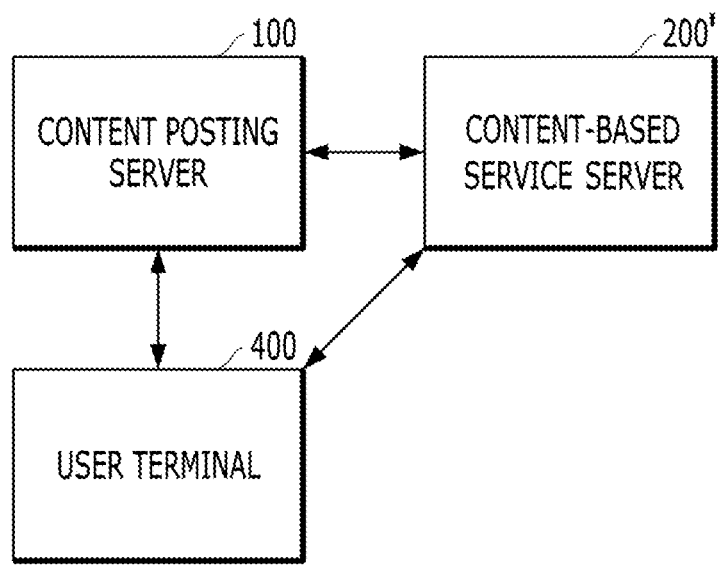

FIGS. 5A, 5B, and 5C are diagrams showing examples of the case in which a service is provided in some forms of the present disclosure;

FIGS. 6A and 6B are diagrams showing examples of the form of a scenery content-related service provided through a vehicle terminal in some forms of the present disclosure;

FIGS. 7A and 7B are diagrams showing examples of the form of a facility content-related service provided through a vehicle terminal in some forms of the present disclosure; and FIGS. 8A and 8B are block diagrams showing an example of a service provision system in some forms of the present disclosure.

DETAILED DESCRIPTION

Exemplary embodiments of the present disclosure are described in detail with reference to the accompanying drawings so that those of ordinary skill in the art may easily implement the same. However, the present disclosure may be implemented in various different forms, and is not limited to these embodiments. To clearly describe the present disclosure, parts not concerning the description are omitted from the drawings, and like reference numerals denote like elements throughout the specification.

In addition, when a certain part "includes" a certain component, this indicates that the part may further include other components, rather than necessarily excluding such other components, unless there is no disclosure to the contrary. The same reference numbers will be used throughout the drawings and the specification to refer to the same parts.

An embodiment of the present disclosure may provide provision of route information of a place for experiencing corresponding content to allow a user to directly have similar experience to the content based on contextual information of the content.

First, prior to a detailed description of a service provision apparatus (system) or a service provision method according to an embodiment of the present disclosure, terms are defined.

The place for experiencing content may refer to a photographing location in the case of content including a video image or a still image that are generated by a content publisher via photography using a photographing device at a specific place. In addition, in the case of content of a procedure in which a content publisher uses a specific facility such as eating at a restaurant, use at an amusement park, purchase at a shop, or concert watching or context thereof, the place for experiencing content may refer to the corresponding facility.

The content stated in embodiments may be content, at least a location of which is to be specified, as an image, a video image, a sound, a text, or combinations thereof. For example, the content may be a post of a social network service (SNS), may be an item corresponding to a website for providing information on evaluation of each store of a specified type of business or information of a specific store provided by an application, an item corresponding to information on evaluation of a specific location of a portal, or an item of conversation of a messenger service such as a chatting application, but this is merely exemplary and the present disclosure is not limited thereto.

However, the content according to the embodiment may include at least information for extracting a position set to a guidance destination of a navigation system for a vehicle or a navigation application executed by a portable terminal irrespective of the form of the content. The information may include global positioning system (GPS) coordinate information for directly extracting a position, information on a trade name for extracting a location via search in a database, information on a place name, or a telephone number. For example, the GPS coordinate information may be included in a photo image, metadata, or map information which configures the content, and the information on the trade name, the information on the place name, and the telephone number may have the form of text or tagging information included in a post.

Figure 1:
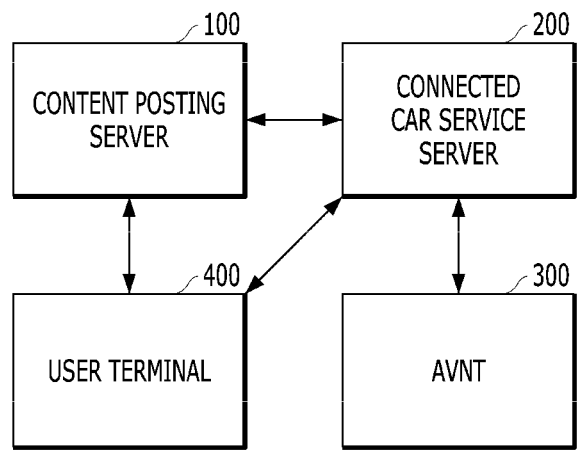
FIG. 1 is a block diagram showing an example of a service provision system in some forms of the present disclosure.

FIG. 1 is a block diagram showing an example of a service provision system according to an embodiment of the present disclosure.

Referring to FIG. 1, the service provision system according to an embodiment may include a content posting server 100, a connected car service server 200, a vehicle terminal 300 (e.g., an audio/video/navigation terminal (AVNT)), and a user terminal 400.

First, the content posting server 100 may provide a service for storing content including a photo image, an image, or the like and posting the content to be read through a browser, an application, or the like. In this case, the content posting server 100 may contain contextual information for generating corresponding content, e.g., a location of the content generation, a date and time of the content generation, or a route in a predetermined form as well as information to be seen, e.g., a photo image or an image. The form in which the contextual information is contained may be metadata stored in a header of an image or a video image or may be tag data, but the present disclosure is not limited thereto. For example, the content posting server 100 may include a server for providing an SNS service, a server for providing evaluation of a specific place or store, or a portal server, but the present disclosure is not limited thereto.

The connected car service (hereinafter referred to as "CCS" for convenience) server 200 may include a cloud system and may operatively associate a user account and a vehicle, i.e., the vehicle terminal 300 with each other through an authentication using the cloud system. The CCS server 200 may receive information related to an operation of a vehicle with the vehicle terminal 300 installed therein through communication with the vehicle terminal 300 or may transfer a control signal or data for controlling at least some functions of the corresponding vehicle, to the vehicle. The CCS server 200 may communicate with an external device connected thereto using a user account, such as the user terminal 400, as well as communicate with the vehicle terminal 300, and in particular, according to embodiments of the present disclosure, when a user logs in through the vehicle terminal 300, the user account may be operatively associated with the content posting server 100, such as an SNS. Therethrough, the CCS server 200 may transfer at least one content information to the vehicle terminal 300 from the content posting server 100 based on activities of a user with respect to a service such as an SNS, provided by the content posting server 100. For example, the CCS server 200 may be embodied to configure a telematics center or a portion thereof, but the present disclosure is not limited thereto.

The vehicle terminal 300 may exchange data with at least the connected car service server 200 via wireless communication and may exchange data under a predetermined condition (e.g., until a preset time elapses after a vehicle is turned off) even if a vehicle is turned off or there is no occupant in the vehicle as well as when the vehicle is turned on. For example, the vehicle terminal 300 may be an AVNT or a head unit, but the present disclosure is not limited thereto. A detailed configuration and function of the vehicle terminal 300 will be described in more detail with reference to FIG. 2.

The user terminal 400 may include a mobile terminal such as a smartphone, a smart tablet, or a notebook computer as well as a fixed terminal such as a personal computer (PC), but this is merely exemplary and the present disclosure is not limited thereto. For example, the user terminal 400 may be any form of terminal as long as the terminal may use a service provided by the content posting server 100 or the CCS server 200 through a browser, an application, or the like. Needless to say, although not shown in FIG. 1, when the user terminal 400 is a smart device, the user terminal 400 may also directly communicate with the vehicle terminal 300 through a predetermined communication protocol (e.g., Wi-Di, BT, ZigBee, or NFC).

Figure 2:
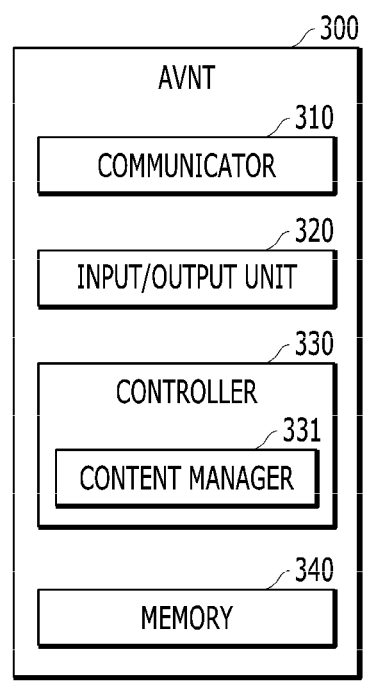
FIG. 2 is a block diagram showing an example of the configuration of a vehicle terminal in some forms of the present disclosure.

FIG. 2 is a block diagram showing an example of the configuration of a vehicle terminal according to an embodiment of the present disclosure.

Referring to FIG. 2, the vehicle terminal 300 according to an embodiment may include a communicator 310, an input/output unit 320, a controller 330, and a memory 340.

The communicator 310 may include a wired communication module (not shown) for performing communication based on a vehicle network with in-vehicle components (e.g., another controller) and a wireless communication module (not shown) for communication with components outside a vehicle, such as the CSS server 200. The wireless communication module may be configured in the form of a telematics module, but the present disclosure is not limited thereto.

The input/output unit 320 may include one or more of devices for receiving or outputting information, such as a voice input/output terminal, a display, a touchscreen, a dial, or a key button.

The controller 330 may control the overall function of components of the vehicle terminal 300, such as the communicator 310 or the input/output unit 320. When the vehicle terminal 300 is configured in the form of an AVNT, the controller 330 may perform computation for multimedia playback, an interface for controlling a function of a vehicle, or providing a navigation function, and in particular, the controller 330 according to an embodiment may include a content manager 331 and may perform a content management function such as acquisition and output of content or output of route information. The content manager 331 may be configured in the form of an embedded module, or may be configured in the form of a function of an operating system driven through the controller 330 or an application executed in the operating system, but the present disclosure is not limited thereto.

The memory 340 may store an operating system, an application, user data, and information on content according to an embodiment as well as temporarily store input and output data for computation of the controller 330 and may include one or more memory devices or modules.

In particular, the controller 330 or the content manager 331 of the vehicle terminal 300 according to an embodiment may store information on content downloaded from the CSS server 200 in a predetermined form (e.g. the form of archive of a personal folder) in the memory 340, and may output the stored content through an output device such as a display when a preset output condition is satisfied. The preset output condition may correspond to the case in which a command for calling at least one content that is pre-acquired through predetermined menu manipulation of a user is input, the case in which the user approaches a position related to at least one pre-acquired content within a predetermined distance, or the case in which content that is newly posted in an SNS subscribed by the user is acquired from the CSS server 200, but this is merely exemplary and the present disclosure is not limited thereto.

FIG. 3 is a flowchart showing an example of a procedure of providing a contextual-information-based service of content according to an embodiment of the present disclosure.

In FIG. 3, it may be assumed that the content posting server 100 provides SNS service, but this is for convenience of description and it will be obvious to one of ordinary skill in the art that the present disclosure is not limited thereto.

Referring to FIG. 3, first, account association may be performed (S301). Here, the account association may mean that an SNS account registered in the content posting server 100 is operatively associated with an account for a connected car service of a user. In this case, the account association may mean that an integrated account between the connected car service and the SNS service is generated, but may be configured in any form as long as the account association assigns authority for access to information on activities of a specific account in the content posting server 100, to an account for the connected car service. As a result, when the account association is completed, the CSS server 200 may become the state in which information on activities of a corresponding SNS service of an SNS account that operatively is associated with the corresponding account is to be acquired from the content posting server 100 through an account for the connected car service. Here, acquisition of information on activities may refer to acquisition of information on content read by a user, content in which preference such as bookmark or like is set, or directly posted content.

The user may do SNS activities such as preferred content setting through the user terminal 400 (S302). Although FIG. 3 illustrates the present operation S302 as an operation after the account association S301, the operation S302 may be performed prior to the account association S301.

The vehicle terminal 300 may notify the CCS server 200 of activation of a posted content-based function according to a command input of the user (S303). The present operation may be replaced with a procedure of setting whether the present function is used in an account of the connected car service through the user terminal 400, and when service usage is set to a default in the vehicle 300, terminal if the account association is checked, the operation may be automatically performed.

When verifying intent to use a corresponding service of a user, e.g., a request for a posted content-based function, the CSS server 200 may search for activities of an SNS service such as posted content information of the corresponding user based on authority acquired through account association in the content posting server 100 and may acquire content information based on the activities (S304). In this case, the acquired content information may be content that is directly set to preferred content by the user or content determined to have high user preference based on the activities of the user. The content information may include an image, a video image, a thumbnail image thereof, contextual information of content, or the like. The search/acquisition of the content information (S304) may be performed according to real-time update notice of the content posting server 100 or may be performed at a predetermined period, but the present disclosure is not limited thereto.

The CSS server 200 may transmit the acquired content information to the vehicle terminal 300 (S305), and the vehicle terminal 300 may store the received content information in the memory 340 or the like (S306). Then, the vehicle terminal 300 may output at least one of stored content information through an output device according to whether a preset content output condition is satisfied (S307).

When there is content information indicating that a selection command from the user in the output content information (S308), the vehicle terminal 300 may notify the CCS server 200 of information on selected content (S309). In this case, the vehicle terminal 300 may also transmit information on the current position to generate route information to be described below by the CCS server 200.

The CCS server 200 may generate route information to have a similar environment to experience of a writer of the corresponding content when the user reaches a position related to the corresponding content based on contextual information of the selected content (S310). In this case, the route information may include information on a departure time for making the user reach at a time or a time range in which the user is capable of having the similar experience to the corresponding content. A more detailed procedure of generating the route information will be described below with reference to FIG. 4.

The route information generated by the CCS server 200 may be transmitted to the vehicle terminal 300 (S311), and the vehicle terminal 300 may provide a service based on the received route information (S312). In this case, the provided service may include at least one of a function for displaying a route including a departure time, function of displaying information on an environment at the time when the content was generated, or a function of guiding to the corresponding route, but the present disclosure is not limited thereto.

FIG. 4 is a flowchart showing n example of a procedure of generating route information by a service server according to an embodiment of the present disclosure. The flowchart of FIG. 4 may correspond to operations S310 to S311 of FIG. 3.

Referring to FIG. 4, the CSS server 200 may acquire contextual information of content selected by a user from the content posting server 100 in order to generate route information based on contextual information (S401). The present operation may be omitted when the contextual information is already acquired in operation S304 of FIG. 3.

When acquiring the contextual information of the corresponding content, the CCS server 200 may generate route information in consideration of a type of content. Determination of a type of content may be performed based on a type of the command input through the vehicle terminal 300 by the user as described below with reference to FIGS. 6A, 6B, 7A, and 7B or may be performed based on artificial intelligence (AI) or big data-content analysis, but the present disclosure is not limited thereto.

First, when content selected by the user is scenery content (YES of S402), the CCS server 200 may acquire information on a photography environment at a time when the photography was taken (S403). For example, the scenery photography is largely affected by a season, sun elevation, a sun direction (a sunrise angle or a sunset angle), weather, or the like, and thus the CCS server 200 may determine a photographing location based on the contextual information and may determine regional weather, sun elevation, a sun direction, and the like at a time when the photography was taken in a corresponding photographing location.

Then, the CCS server 200 may determine the time at which a similar external environment to the time when the photography was taken is formed (S404). For example, the CCS server 200 may determine a similar environment forming time that is at least one future time at which sun elevation, sun direction, or weather corresponds to same or similar environment to the time at which content is generated at the corresponding photographing location. To this end, the CCS server 200 may set different weights for respective factors such as sun elevation, a sun direction, weather, or a season and may also align the similar environment forming time in descending order so that the higher sum of weights is followed by the lower sum of weights.

When determining at least one similar environment forming time, the CCS server 200 may determine a route for reaching a content photographing location at each of at least one similar environment forming time or a previous time thereof based on the current location of the vehicle, may inversely calculate the departure time, and may generate route information (S405). In this case, the departure time may include the latest departure time for reaching the content photographing location prior to the similar environment forming time with respect to each similar environment forming time, but the present disclosure is not limited thereto.

When content selected by the user is facility content (YES of S406) but not scenery content (NO of S402), the CCS server 200 may specify a content-related facility based on the contextual information and may check an operating time of the corresponding facility (S407).

When determining the operating time of the corresponding facility, the CCS server 200 may determine a route for reaching the corresponding facility at the operating time or a previous time thereof based on the current location of the vehicle, may inversely calculate the departure time, and may generate the route information (S408). In this case, the departure time may be generated for each number of times when an operating time in a day is divided into a plurality of numbers of times (e.g., a show time in a theater or lunch/dinner in a restaurant), and when a facility is a restaurant, the departure time may also be determined to consider an average time taken to have a meal, a final order deadline, or the like.

When the content selected by the user does not correspond to any of scenery or facility content (NO of S406), route information to a location related to corresponding content may be generated according to a route search logic (e.g., real-time traffic information based logic, a driveway priority based logic, the shortest distance, or the shortest time) set to a default (S409).

When the route information is completely generated, the CCS server 200 may transmit the generated route information to the vehicle terminal 300 (S410).

When a vehicle is not capable of entering the position of a facility or the photographing location during the aforementioned procedure, the CCS server 200 may set the destination of the route information to the closest position that the vehicle is capable of entering or the closest parking space, and depending on settings, and may further guide the user to a walking route through the user terminal 400.

Hereinafter, detailed cases in which a context-based service is provided through a vehicle terminal will be described with reference to FIGS. 5A, 5B, 5C, 6A, 6B, 7A and 7B.

FIGS. 5A, 5B, and 5C are diagrams showing examples of the case in which a service is provided in some forms of the present disclosure.

First, referring to FIG. 5A, a user may generate information on activities, e.g., settings about whether content is preferred in content 510 provided by the content posting server 100, such as an SNS service, through a smart tablet 400A as a user terminal. An account used in the SNS service may be operatively associated with a connected car service account through a connected car service application 520 or the like.

Then, when the CSS server 200 transmits content information to the vehicle terminal 300, the content information may be transmitted in the form of a thumbnail image 530 through a display 321 of the vehicle terminal 300 according to whether an output condition is satisfied as shown in FIG. 5B. Here, when the user selects specific content information, and for example, selects the thumbnail image 530, the CSS server 200 may generate route information based on contextual information of the corresponding content.

The generated route information may be transmitted to the vehicle terminal 300, and route information 540 for reaching a location related to corresponding content may be displayed in the form through the display 321 as shown in FIG. 5C. When there is a spot related to other content on a route or within a predetermined distance from the route, information 550 on the other content may also be displayed.

FIGS. 6A and 6B are diagrams showing examples of the form of a scenery content-related service provided through a vehicle terminal in some forms of the present disclosure. FIGS. 6A and 6B illustrate a subsequent procedure as the specific content information is selected in FIG. 5B.

First, referring to FIG. 6A, as specific content information of content information displayed on the display 321 of the vehicle terminal 300 is selected, additional menus 621, 622, and 623 may be provided together with a representative image 610 of corresponding content. The additional menus may include scenery experience 621, facility usage 622, and a route 623, and here, when the user selects the scenery experience 621, the CCS server 200 may proceed to YES in operation S402 of FIG. 4.

As a result, when route information is received from the CCS server 200, the route information 630 may be displayed as shown in FIG. 6B. As shown in the drawing, the route information 630 include may information on a photography environment at the time when the photography was taken and information on at least one departure time for arrival at a time of providing a similar environment to the time when the photography was taken.

FIGS. 7A and 7B are diagrams showing examples of the form of a facility content-related service provided through a vehicle terminal in some forms of the present disclosure. FIGS. 7A and 7B also illustrate a subsequent procedure as the specific content information is selected in FIG. 5B.

First, referring to FIG. 7A, as specific content information of content information displayed on the display 321 of the vehicle terminal 300 is selected, an additional menu may be provided together with a representative image 710 of the corresponding content. When facility usage 720 of the additional menu is selected, the vehicle terminal 300 may notify a CCS server of selection of the corresponding content for facility usage, and the CCS server 200 may proceed to YES of operation S406 of FIG. 4.

As a result, when route information is received from the CCS server 200, the received route information 730 may be displayed as shown in FIG. 7B. As shown in the drawing, the route information 730 may include information on an operating time of a facility related to the corresponding content and information on a departure time for each operating time. The user may also be notified of information indicating that the vehicle is not capable of reaching a destination with respect to an operating time in which a service is not usable even if the vehicle departs now.

The aforementioned method and form of outputting route information and the type and the form of the additional menu may be merely exemplary, and it will be obvious to one of ordinary skill in the art that various modifications are made.

For example, in some forms of the present disclosure, a function performed by the vehicle terminal 300 may also be performed by the user terminal 400 or another user terminal held by a driver. In this case, the configuration of a service provision system will be described with reference to FIGS. 8A and 8B.

FIGS. 8A and 8B are block diagrams showing an example of a service provision system in some forms of the present disclosure.

Referring to FIG. 8A, compared with the service provision system shown in FIG. 1, the CCS server 200 may be replaced with a content-based service server 200' and the vehicle terminal 300 may be replaced with a navigation terminal 300'. Except for this, the overall configuration of FIG. 8A is similar to the configuration of FIG. 1, and thus will be described in terms of a difference therefrom.

Similarly to the CCS server 200, the content-based service server 200' may manage a different user account from the content posting server 100, and the user account corresponding to the corresponding server 200' may be operatively associated with an SNS account registered in the content posting server 100. In addition, as described above, the account association may mean that an integrated account between the content-based service and the SNS service is generated, but may be configured in any form as long as the account association assigns authority for access to information on activities of a specific account in the content posting server 100, to an account for the content-based service.

The content-based service server 200' may communicate with an external device connected thereto using a user account, such as the user terminal 400, as well as communicate with the navigation terminal 300'. Therethrough, the content-based service server 200' may transfer information on at least one content to the navigation terminal 300' from the content posting server 100 based on activities of a user with respect to a service such as an SNS, provided by the content posting server 100.

For example, the content-based service server 200' may basically have a function for providing route information based on a destination requested by a navigation application driven by the navigation terminal 300' and may be configured to additionally provide content-based route guidance according to the present embodiment, but the present disclosure is not limited thereto.

The navigation terminal 300' may exchange data with at least the content-based service server 200' via wireless communication and may include at least a display. For example, the vehicle terminal 300 may include a smartphone, a smart tablet, or the like, but the present disclosure is not limited thereto. The navigation terminal 300' may have a similar configuration to the vehicle terminal 300 described above with reference to FIG. 2 except for a vehicle-specific component (e.g., a wired communication module).

As shown in FIG. 8B, the navigation terminal 300' and the user terminal 400 may be the same device. That is, a user may use an SNS or the like in the content posting server 100 through the user terminal 400 and may also receive content information from the content-based service server 200' by driving a navigation application or the like to select content. That is, a posting content-based route guidance function may be configured to perform one function (or search options) of a navigation application. In this case, route information for a similar experience corresponding to the selected content may also be received by the user terminal 400 and the route guidance for the similar experience may be provided through the user terminal 400.

Therethrough, even if the vehicle terminal 300, a telematics center, or the like does not correspond to a posting content-based service, when a user has only the navigation terminal 300' or the user terminal 400, the user may be provided with route guidance.

A detailed service provision procedure using the configuration of the system shown in FIG. 8A or 8B is similar to FIG. 3 as long as the CCS server 200 is replaced with the content-based service server 200' and the vehicle terminal 300 is replaced with the user terminal 400 or the navigation terminal 300', and thus a repeated explanation thereof will not be given.

In addition, under the configuration of the system shown in FIGS. 8A and 8B, when a positing content-based function is requested to the content-based service server 200' through the terminal 400 or 300' owned or held by a user, but not the vehicle terminal 300 (i.e., which corresponds to operation S303 of FIG. 3) or when the selected content is informed (i.e., which corresponds to operation S309 of FIG. 3), information on a type of a vehicle (e.g., a private car, public transportation, or walking) may be transmitted together. In this case, the content-based service server 200' may generate route information to correspond to the type of the vehicle when generating route information (which corresponds to operation S310 of FIG. 3). Therethrough, even if the user is not capable of using a car, the user may be provided with route information including a departure time for a similar experience to selected content through public transportation or the like.

The service provision apparatus related to at least one embodiment of the present disclosure as configured above may provide a more convenient contextual information based service for a vehicle.

In particular, the service provision apparatus according to embodiments may extract contextual information from content and may guide a user to a departure time as well as a recommended route, and similar thus experience to the corresponding content may be achieved when a vehicle departs according to guidance.

It will be appreciated by persons skilled in the art that that the effects that could be achieved with the present disclosure are not limited to what has been particularly described hereinabove and other advantages of the present disclosure will be more clearly understood from the detailed description.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the disclosures. Thus, it is intended that the present disclosure cover the modifications and variations of this disclosure provided they come within the scope of the appended claims and their equivalents.

What is claimed is:

1. A method of providing a content contextual-information-based service, the method comprising:
    acquiring an image among a plurality of images in a server based on an account of a user and based on the user setting a "like" on the image, wherein the image comprises an image previously posted by another in the server by activities through a social network service (SNS) and wherein the image is a still image or a video image;
    acquiring a photographing location and a time of the image;
    transmitting information related to the image to a terminal;
    determining that content information related to the transmitted information has been selected at the terminal;
    in response to the content information being selected at the terminal, generating route information for a vehicle to arrive in a place and at a time when an expected environment at the place and time is expected to be similar to an environment when the image was generated, the expected environment based on contextual information of the image corresponding to the selected content information; and
    transmitting the route information to the terminal, wherein generating the route information comprises:
        determining information on the environment when the image was created in the photographing location based on the contextual information,
        determining a period of time when an environment at the place has a predetermined range of similarity to the information on the environment when the image was created based on a season, sun elevation, a sun direction, and weather, and
        generating the route information comprising a departure time and a route for reaching the place at a time before the period of time elapses based on a current position of the terminal, wherein determining the period of time comprises setting weights for the season, the sun elevation, the sun direction, and the weather respectively with respect to each of a plurality of periods of time, determining a sum of the weights for each of the plurality of periods of time, and ordering the plurality of periods of time based on the sum of the weights thereof.

2. The method of claim 1, wherein the images posted in the server comprise images posted on one or more of a social media, a messenger service, or a service for information for evaluation of each place.

3. The method of claim 2, wherein the image comprises an image from a post of the social media.

4. The method of claim 1, wherein acquiring the image comprises acquiring the image based on a first account of the user, the method further comprising acquiring the content information using a second account of the user when the first account of the user is operatively associated with the second account of the user.

5. The method of claim 1, wherein the method comprises acquiring the content information based on whether the user sets a preference corresponding to the information related to the activities of the user.

6. A non-transitory computer-readable recording medium having a program recorded thereon, wherein the program, when executed by a processor, enables the processor to perform:
    acquiring an image among a plurality of images in a server based on an account of a user and based on the user setting a "like" on the image, wherein the image comprises an image previously posted by another in the server by activities through a social network service (SNS) and wherein the image is a still image or a video image;
    acquiring a photographing location and a time of the image;
    transmitting information related to the image to a terminal;
    determining that content information related to the transmitted information has been selected at the terminal;

in response to the content information being selected at the terminal, generating route information for a vehicle to arrive in a place and at a time when an expected environment at the place and time is expected to be similar to an environment when the image was generated, the expected environment based on contextual information of the image corresponding to the selected content information; and transmitting the route information to the terminal, wherein generating the route information comprises:
  determining information on the environment when the image was created in the photographing location based on the contextual information,
  determining a period of time when an environment at the place has a predetermined range of similarity to the information on the environment when the image was created based on a season, sun elevation, a sun direction, and weather, and
  generating the route information comprising a departure time and a route for reaching the place at a time before the period of time elapses based on a current position of the terminal, wherein determining the period of time comprises setting weights for the season, the sun elevation, the sun direction, and the weather respectively with respect to each of a plurality of periods of time, determining a sum of the weights for each of the plurality of periods of time, and ordering the plurality of periods of time based on the sum of the weights thereof.

7. The method of claim 4, wherein the second account of the user is an account related to a connected car service.

8. A system comprising a server, wherein the server comprises at least one processor and a non-transitory memory storing computer readable code that, when executed by the processor, causes the processor to:
  acquire an image among a plurality of images in a second server based on an account of a user and based on the user setting a "like" on the image, wherein the image comprises an image previously posted by another in the server by activities through a social network service (SNS) and wherein the image is a still image or a video image;
  acquire a photographing location and a time of the image;
  transmit information related to the image to a terminal;
  determine that content information related to the transmitted information has been selected at the terminal;
  in response to the content information being selected at the terminal, generate route information for a vehicle to arrive in a place and at a time when an expected environment at the place and time is expected to be similar to an environment when the image was generated, the expected environment based on contextual information of the image corresponding to the selected content information; and
  transmit the route information to the terminal, wherein the server is configured to generate the rout information by:
    determining information on the environment when the image was created in the photographing location based on the contextual information,
    determining a period of time when an environment at the place has a predetermined range of similarity to the information on the environment when the image was created based on a season, sun elevation, a sun direction, and weather, and
    generating the route information comprising a departure time and a route for reaching the place at a time before the period of time elapses based on a current position of the terminal, wherein determining the period of time comprises setting weights for the season, the sun elevation, the sun direction, and the weather respectively with respect to each of a plurality of periods of time, determining a sum of the weights for each of the plurality of periods of time, and ordering the plurality of periods of time based on the sum of the weights thereof.

9. The system of claim 8, wherein the images posted in the second server comprise images posted on one or more of a social media, a messenger service, or a service for information for evaluation of each place.

10. The system of claim 9, wherein the image comprises an image from a post of the social media.

11. The system of claim 8, wherein the server is configured to acquire the image by acquiring the image based on a first account of the user and wherein the computer readable code causes the processor to acquire the content information using a second account of the user when the first account of the user is operatively associated with the second account of the user.

12. The system of claim 11, wherein the second account of the user is an account related to a connected car service.

13. The system of claim 8, wherein computer readable code causes the processor to acquire the content information based on whether the user sets a preference corresponding to the information related to the activities of the user.

14. The system of claim 8, further comprising the terminal, wherein the terminal is configured to:
  receive the information related to the image from the server;
  select the content information related to the received information; and
  transmit information related to the selected content information to the server.

15. The system of claim 14, wherein the terminal comprises a vehicle terminal.

16. The system of claim 14, wherein the terminal comprises a user terminal.

17. The non-transitory computer readable recording medium of claim 6, wherein the images posted in the server comprise images posted on one or more of a social media, a messenger service, or a service for information for evaluation of each place.

18. The non-transitory computer readable recording medium of claim 17, wherein the image comprises an image from a post of the social media.

19. The non-transitory computer readable recording medium of claim 6, wherein:
  acquiring the image comprises acquiring the image based on a first account of the user; and
  the program, when executed by the processor, enables the processor to perform acquiring the content information using a second account of the user when the first account of the user is operatively associated with the second account of the user.

20. The non-transitory computer readable recording medium of claim 6, wherein the program, when executed by the processor, enables the processor to perform acquiring the content information based on whether the user sets a preference corresponding to the information related to the activities of the user.

* * * * *